Nov. 19, 1935.                R. C. BENNER ET AL                2,021,221
           METHOD OF AND APPARATUS FOR PRODUCING FUSED
                  REFRACTORY AND ABRASIVE MATERIALS
                        Filed Jan. 20, 1933

INVENTORS
RAYMOND C. BENNER
GEORGE J. EASTER
BY
ATTORNEY

Patented Nov. 19, 1935

2,021,221

UNITED STATES PATENT OFFICE 2,021,221

METHOD OF AND APPARATUS FOR PRODUCING FUSED REFRACTORY AND ABRASIVE MATERIALS

Raymond C. Benner and George J. Easter, Niagara Falls, N. Y., assignors to The Carborundum Company, Niagara Falls, N. Y., a corporation of Pennsylvania Application January 20, 1933, Serial No. 652,672

9 Claims. (Cl. 13—5)

This invention relates to an improved method of producing fused refractory and abrasive materials, particularly oxides and silicates of aluminum and other metals.

It has hitherto been the practice to make fusions of such materials in an arc furnace in which two electrodes are suspended in a water cooled pot and an arc formed at the lower end of these electrodes, the material to be fused being gradually fed in to build up a pig to the full depth of the pot. This method has been found to have certain disadvantages, due principally to the fact that there is an extremely reducing atmosphere and an excessively high temperature in the immediate vicinity of the arc, and the fact that in building a pig in the manner described the lower end of the pig becomes somewhat viscous before the upper end has been completed.

The result of the excessive temperature in the neighborhood of the arc is that the more volatile constituents, and particularly silica, tend to be distilled from the melt in large and irregular quantities; resulting in a serious loss of heat and of material, and the even greater objection that the material produced is non-homogeneous and of variable composition from one melt to the next and to some extent even from point to point within a given melt. Another difficulty with the usual fusion method arises in that there is a large amount of reduction of certain oxides to metal in the arc, and while in the production of fused oxides from impure raw materials a certain amount of reduction is necessary and desirable, it has been found that certain constitutents which it is not desired to reduce are frequently reduced to metallic form along with the materials such as iron oxide where this reduction is generally definitely desirable.

The reduction of these oxides is accompanied by evolution of carbon monoxide gas which increases the already considerable turbulence of the bath adjacent the arc and results in dispersing the metallic particles throughout the bath as very fine shot. The gas itself is also carried through the bath in small bubbles which are objectionable where it is desired to pour a solid pig for refractory purposes.

It is customary to allow the metallic particles, which are of higher density than the fused oxides, to settle to the bottom and chip them out after the pig has solidified. The difficulty of accomplishing this is obviously increased by the turbulence of the upper portion of the bath and the fact that the lower portion of the pig becomes somewhat viscous before the top has been completed, resulting in the presence of metallic shot throughout the entire mass to a greater or less extent. This is particularly objectionable when the material is to be used for refractories in glass tanks and similar work where the iron and other metallic particles not only accelerate the destruction of the refractory in service, but result in very objectionable contamination and discoloration of the glass in contact therewith.

In our improved method of furnacing, we utilize a high frequency or other inductively heated furnace using a carbon crucible or a carbon core in the form of one or more rods to generate heat entirely within the mass to be fused. Under the term carbon we include graphite and any other electrically conducting form of carbon. By the use of such a furnace we avoid excessive local heating of the type encountered in arc furnaces, resulting in an increase in thermal efficiency and lessening of the objectionable volatilization, and are able to very closely control the degree of reduction. Furthermore, the fact that heat is simultaneously generated throughout a relatively large proportion of the entire furnace results in a substantial improvement in the homogeneity of the melt, which is highly fluid from top to bottom without the high turbulence characteristic of the arc, thus permitting the metallic particles to more readily segregate and permitting the diffusion of the various fused oxides uniformly throughout the pig.

In the case of furnacing materials high in silica, such as mixtures of alumina and silica containing 30 per cent or more of the latter constituent, great difficulty has been experienced in operating with the ordinary arc furnace as the presence of the silica tends to extinguish the arc, due possibly to its tendency to volatilize or to its low electrical conductivity when present in a molten bath. With our high frequency method of furnacing, we depend largely, if not entirely, upon heat generated within the carbon, and the silica thus does not interfere as in the case of the arc, so that we are able to much more readily produce fusions containing any desired percentage of silica.

A further advantage in the use of induction rather than arc furnaces for fusing metallic oxides or silicates results from the fact that the former may readily be made to operate continuously if desired whereas it is very difficult to arrange an arc furnace in such a way that the tap hole may be kept open continuously.

As an illustration of our method of furnacing, we shall describe the production of fused mullite which comprises alumina and silica in the ratio of 3 mols. of the former to two of the latter, or approximately 72 per cent $Al_2O_3$ by weight. To produce this material we take bauxite which has been calcined to drive out water, and admix it with bauxitic clay or kaolin which should also be precalcined to drive out the water, the composition of the two materials in a representative case being:

|  | Bauxite | Kaolin |
| --- | --- | --- |
|  | Percent | Percent |
| Ign | 27.6 | 13.5 |
| $SiO_2$ | 12.4 | 46.3 |
| $Al_2O_3$ | 56.7 | 36.3 |
| $Fe_2O_3$ | 1.6 | 1.6 |
| $TiO_2$ | 1.6 | 0.3 |

With raw materials high in iron oxide, we admix an amount of crushed coke sufficient to reduce from 85 to 100 per cent of the iron oxide plus titania present. Any remainder of these materials is reduced by the carbon of the conductor. Extreme pulverization of the ingredients is not required, although it is desirable not to have large lumps present on account of the slowness with which they become completely molten and permit reduction of the iron oxide to metallic form.

In a similar manner, when it is desired to produce fused alumina rather than mullite, we prepare a mix containing bauxite or other high aluminous material together with sufficient coke to reduce not only the iron oxide but the silica. It is also desirable to add additional iron in the form of turnings, etc. in order that the ferrosilicon produced in the furnacing operation may contain less than approximately 16 per cent silicon, as when the silicon is above that value the material is non-magnetic and metallics cannot be readily removed magnetically from the oxide after the latter is crushed up for abrasive purposes for instance. In either the mullite or alumina fusions, the mix in the furnace is brought to a temperature sufficient to make the melt highly fluid and the furnace then kept at this temperature until the fusion becomes quiet and gas evolution largely ceases, after which the melt is ready to tap or pour.

Figure 1:
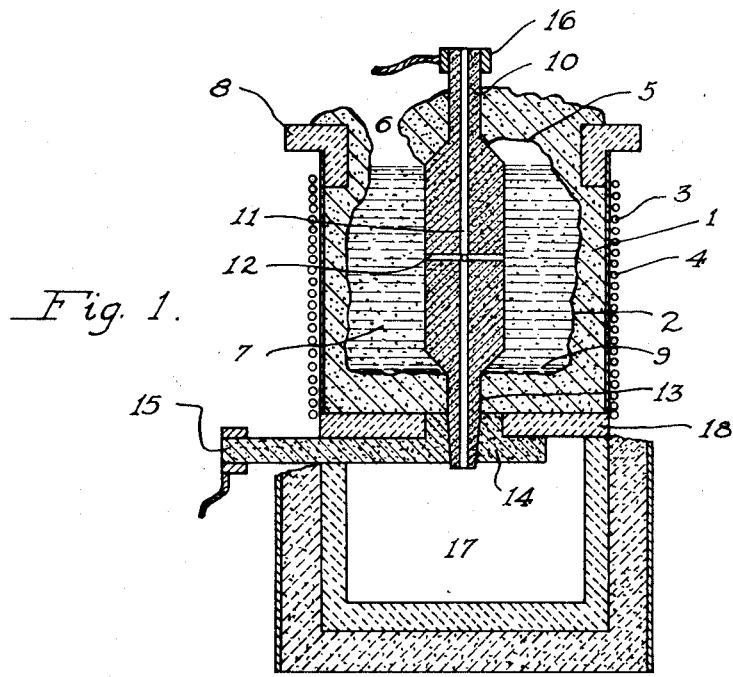
Figure 1 shows a diagrammatic vertical cross-section through the axis of an induction furnace arranged for tapping, loaded with a charge and having a single graphite heating element along the axis of the furnace.

In the operation of our furnace for the production of such fusions, we place the admixed materials 1 within the furnace as shown in Figure 1 embedding a carbon or graphite rod 2 in the center. The coils 3 of the furnace contain water for cooling purposes. We prefer to circulate water through these coils by suction rather than by pressure, since in case a coil burns through or springs a leak, the danger of an explosion is greatly reduced if a large supply of water is not forced into the hot furnace. The coils are electrically insulated from the material within the furnace by any of the suitable insulators such as mica sheath 4 which are well known in the operation of furnaces of this type. It is not necessary that this insulator be extremely refractory as in our furnace the molten material is chilled by loss of heat through the outer layer of the charge to the cooling coils comprising the electrical conductor. The material forms its own refractory container. After charging the furnace, we apply an alternating current of sufficiently high frequency to the coils to induce in the carbon rod a current which heats the rod and the surrounding material until the latter becomes fused. From about 1000 cycles to 50,000 cycles per second is useful for this purpose.

Inasmuch as the oxidation of carbon in the charge as well as a certain amount of oxidation of the carbon rod produces carbon monoxide gas, it is necessary to provide a vent for the removal of this gas after an appreciable portion of the charge has been melted and a solid shell 5 has formed somewhat as shown as a result of the molten material running into the nearest interstices of the unfused material and there congealing. This venting we accomplish by breaking a hole 6 through the shell with an iron bar. The hole thus broken may be utilized to add more material to the bath 7 in the furnace, although the bath also grows by fusion of the material constituting the shell until such time as the molten mass extends within a few inches of the cooling coils of the furnace, after which heat is removed so rapidly by these coils that the further advance of the fused face becomes impossible.

When fusion has been carried to the desired extent, the molten material may be tapped out as described below or may be discharged through the vent in the top of the furnace by tilting the furnace and pouring the material out, suitable provision being made for protecting the vulnerable parts of the furnace coils by refractories indicated as 8 in the drawing. After the fused oxide has been poured out, any metallic material 9 at the bottom is poured into a separate container.

In order that the carbon rod may not tip over sidewise and endanger the furnace coils by melting the charge in contact with them, it is in general advantageous either to extend it beyond the coils at one end, or to form one end into a projecting special shape designed to become interlocked with the semi-fused material, such for instance as the extension 10 of smaller diameter. Heat is conducted away from such a portion so readily as to keep the material in which it is embedded cold enough to hold the rod firmly in position.

After the molten material has been poured, a fresh charge may be inserted within the furnace and operation resumed, or after the carbon rod has become so reduced in size as to make this undesirable the central portion of the shell may be chipped out and a new rod inserted and operation continued as formerly.

Figure 1 also illustrates provision for continuous operation if desired. In such a case a hole 11 of 1½ inches to 2 inches in diameter is provided axially through the carbon, with one or more smaller feeder holes 12 approximately perpendicular thereto through which the molten material may enter and flow into hole 11 and out the lower end into a suitable container. The holes 12 should be of about ½ inch diameter and at such an angle that only molten material can enter them. It is to be understood that such holes are not required unless it is desired to operate the furnace continuously, being illustrated as an alternative form in the same drawing as a matter of convenience.

As a further alternative to the tilting method of removing the charge, a suitable tap hole may be provided in the bottom of the furnace as also shown in Figure 1 and at desired intervals this hole may be opened by removal of the plug 13, which in the figure constitutes a part of the heating rod, and any desired portion of the melt can be tapped out.

As illustrated in Figure 1, the tapered plug 13 is seated in a lower member 14 composed of graphite or similar electrically conducting refractory material to which electrical connection is made through extension 15. Electrical contact is also made with the upper end of the plug through contact 16. When it is desired to tap the furnace, the high frequency current is shut off and a suitable source of ordinary low potential applied through contacts 14 and 16 in order to strongly heat the ends of the carbon and fuse the material immediately adjacent them, thus permitting ready raising of the plug from its seat without disturbance of the solidified furnace shell, particularly at its lower end. When any accumulated metal has been tapped out, the flow is stopped by replacing the plug while the mold 17 is put in place, the plug again removed and the mold filled. This method of additionally heating the lower end of the carbon is also very helpful in removing any solidified material from the hole 11 in the case previously considered, thus insuring free flow for continuous operation. The refractory 18 constituting the bottom of the furnace should be made of a refractory of high thermal conductivity so that heat will be remvoed from the bottom of the charge fast enough to keep molten material from breaking through at undesired points during operation of the furnace.

It is obviously possible to tap the furnace by the simpler method of using a steel bar to break through a hole which could be provided for the purpose in the bottom of the furnace, but this gives a sudden flood of molten material which is almost impossible to control.

Figures 2, 3:
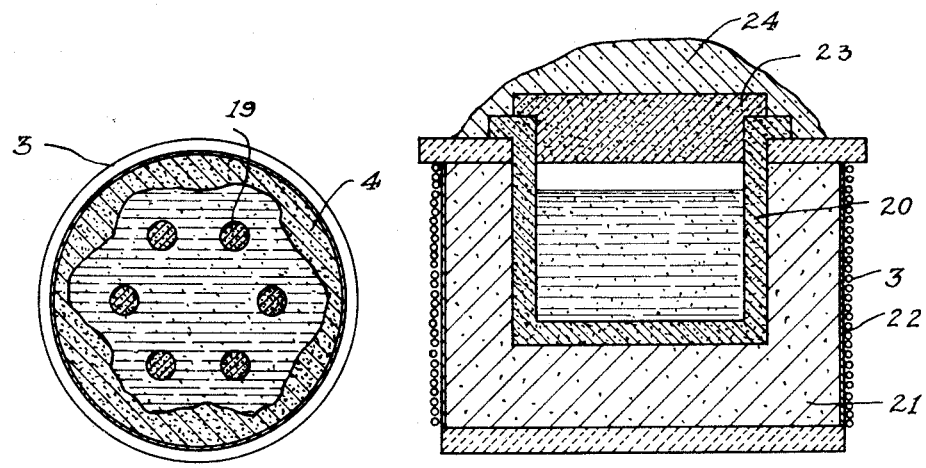
Figure 2 is a horizontal section through a loaded furnace equipped with a plurality of heating elements.
Figure 3 shows a vertical section through a furnace in which the charge is held in and heated by a graphite crucible instead of being heated by rod conductors.

Instead of utilizing a single carbon or graphite rod along the axis of the furnace, we may place a number of smaller rods 19 at different positions in the mix as shown in Figure 2 or we may utilize a crucible 20 to contain the mix as illustrated in Figure 3, the crucible being insulated from the furnace coils by a suitable thickness of lampblack 21 and by mica 22 or a surrounding fused silica cylinder in the manner well known to users of such furnaces. The layer of lampblack should, in general, be at least 2 inches thick and should be replenished from time to time, the top of the furnace being constructed to permit such replenishment. It is desirable that a lid 23 be provided for the crucible although this lid should not be so tightly fitting as to prevent escape of gases. This lid is also protected from loss of heat and from oxidation by lampblack 24 piled thereon.

The use of crucibles is, in general, considerably more expensive than the use of rods, but has been found adapted for the making of small melts in which it is desired to get a pour which is free from unfused material or from impurities from former runs. It is also possible to secure better electrical linkage using a crucible in a small furnace than by using a rod type heating resistor so that the electrical efficiency of the furnace is somewhat increased.

We claim:

1. In an electric furnace, a carbon resistor embedded in a charge of material which is to be fused by heat generated in said resistor, the resistor being surrounded by a high frequency electric heating coil for heating the central portion thereof and having connected to it leads for passing an electric current of lower frequency through said carbon to heat the terminal portions thereof preferentially when it is desired to release it from the said charge of material.

2. In the process of producing fused refractory oxides in an inductively heated furnace, in which the tap hole is closed with a plug of carbon, the step which comprises heating the plug by passing current directly through it to fuse the material around it and permit removal of the plug at such times as it is desired to tap material from the furnace.

3. The process of continually fusing refractory materials surrounding a carbon resistor in an inductively heated furnace, which comprises mounting a resistor in an inductive furnace with a portion of the materials packed about an extension of the resistor and preventing said portion reaching a temperature at or above the melting point of the materials to prevent displacement of the resistor while fusing other portions of the material by induced currents in the resistor.

4. The method of continually producing fused refractory oxides which comprises generating heat within a mass of the refractory oxides by an inductively heated carbon resistor, confining the material as it is melted within the unmelted material surrounding the same by dissipating heat from the exterior of the mass, tapping off molten material through the confining unmelted oxides, and adding unfused refractory oxides on top of the bath of molten oxide.

5. The method of producing fused refractory oxides which comprises generating heat within a mass of the refractory oxides by an inductively heated carbon resistor embedded therein, confining the material as it is melted within the unmelted material surrounding the same by dissipating heat from the exterior of the mass, heating a downwardly projecting portion of the carbon resistor to free it from the surrounding refractory oxides, and tapping off molten oxide by withdrawing the carbon resistor thus freed.

6. In an electric furnace, a carbon resistor surrounded by a high frequency electric heating coil, an end portion of said resistor being of reduced cross section, and leads connected to said resistor adapted to be connected in an electric circuit to preferentially heat said end portion of the carbon resistor.

7. In apparatus for melting refractory oxides, a carbonaceous resistor embedded in a mass of the material to be melted, means for inductively heating a portion of said resistor sufficiently to melt the oxide in contact therewith, said resistor also having another portion extending into a more remote portion of the material to be melted, said latter portion being insufficiently heated inductively to melt the oxide in contact therewith, whereby the position of the resistor with respect to the inductive heating means remains substantially unaltered during prolonged operation of the apparatus.

8. With the apparatus of claim 7, means for heating the latter portion of the resistor by passage of ordinary low frequency current therethrough sufficiently to melt the surrounding material and free the resistor therefrom when desired.

9. The method of continuously producing fused refractory oxides which comprises generating heat within a mass of the refractory oxides by means of an inductively heated carbon resistor, confining the material as it is melted within the unmelted material surrounding the same by dissipating heat from the exterior of the mass, and additionally heating the lower end of said carbon resistor to permit flow of the molten material through a hole extending from the molten mass and through the lower portion of the resistor.

RAYMOND C. BENNER.
GEORGE J. EASTER.